May 6, 1924.

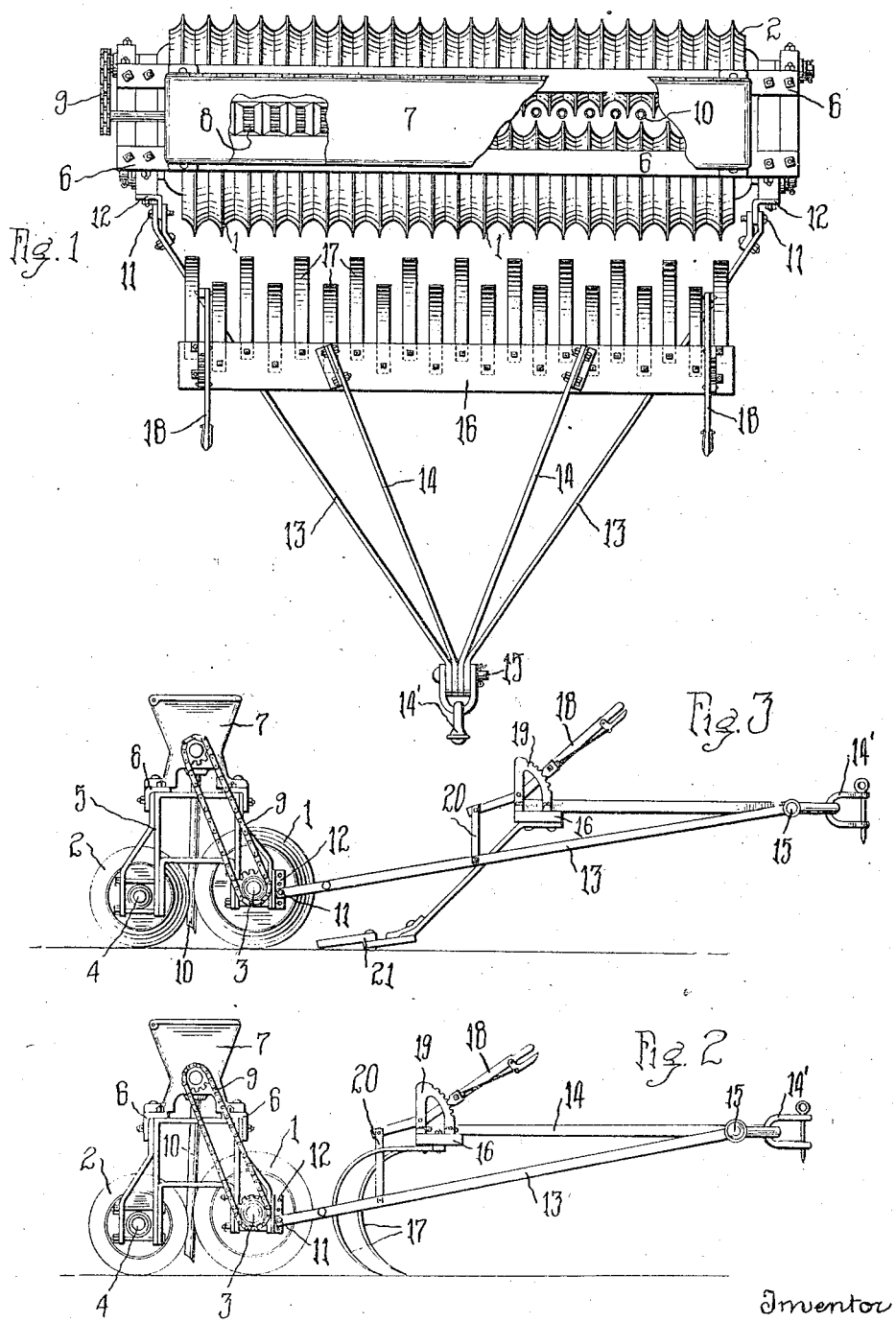

A. S. KROTZ

AGRICULTURAL IMPLEMENT

Filed Dec. 15, 1919

Inventor
Alvaro S. Krotz
By Attorneys

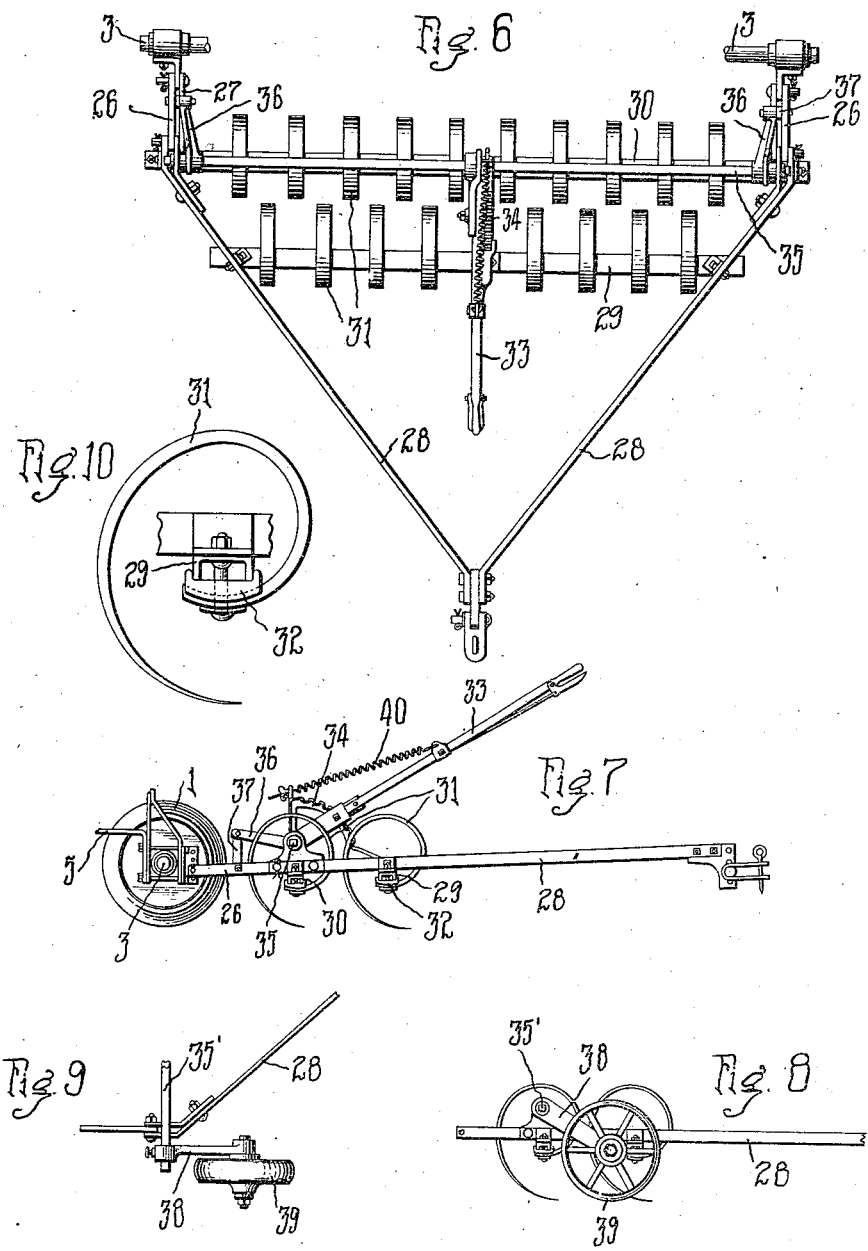

Patented May 6, 1924.

1,493,448

UNITED STATES PATENT OFFICE.

ALVARO S. KROTZ, OF JANESVILLE, WISCONSIN, ASSIGNOR TO GENERAL MOTORS CORPORATION, OF DETROIT, MICHIGAN, A CORPORATION OF DELAWARE.

AGRICULTURAL IMPLEMENT.

Application filed December 15, 1919. Serial No. 344,911.

*To all whom it may concern:*

Be it known that I, ALVARO S. KROTZ, a citizen of the United States, and a resident of Janesville, county of Rock, and State of Wisconsin, have invented certain new and useful Improvements in Agricultural Implements, of which the following is a full, clear, concise, and exact description, such as will enable others skilled in the art to which the invention relates to make and use the same, reference being made therein to the accompanying drawings, which form a part of this specification.

My invention relates to agricultural implements and especially to an implement designed to loosen, pulverize and compact the surface to be treated, also to the combination therewith of a seeding mechanism.

It is common practice to utilize some form of clod-crushing or pulverizing implement, and also to treat the surface with disintegrating and leveling devices of the toothed harrow type. Of the toothed harrow type of implements, the one known as the spring-toothed harrow is in general the most satisfactory. The treatment with a toothed harrow of a surface upon which a crust has formed results however in the production of a large number of clods and the exposure of these clods to the air causes them to harden rapidly because of evaporation of moisture. It is important therefore to follow the harrowing operation with a clod crushing operation and it is doubly important that the latter be immediately subsequent to the former.

It is furthermore important in the treatment of many soils that the surface should be left in a somewhat compacted condition and also that it be left in the form of alternate ridges and furrows from which result well-known advantages in regard to evaporation, absorption and erosion. This formation of a compacted and ridged surface is peculiarly advantageous in connection with the seeding operation, and it is further highly desirable that the surface disintegrating or the clod-crushing operation should immediately precede the seeding operation in order that the soil may be put in more finely pulverized condition and evaporation may be lessened.

It is the object of my invention to provide an implement in which shall be combined means for obtaining the advantages above pointed out. With this object in view the invention consists in the combination in a single implement of a plurality of soil-treating devices each of which shall supplement the other in a new and more advantageous manner than has hitherto been possible.

In the accompanying drawings:

Fig. 1 is a plan view, partially in section, showing one embodiment of my invention.

Fig. 2 is a side elevation of the implement shown in Fig. 1.

Fig. 3 is an elevation of an implement showing another form of surface-preparing device.

Fig. 6 is a plan and Fig. 7 an elevation of an implement modified particularly in the adjusting means.

Figs. 8 and 9 are, respectively, an elevation and a plan showing another means for adjustment, and Fig. 10 is a detail view of the spring tooth mounting.

Figure 4:
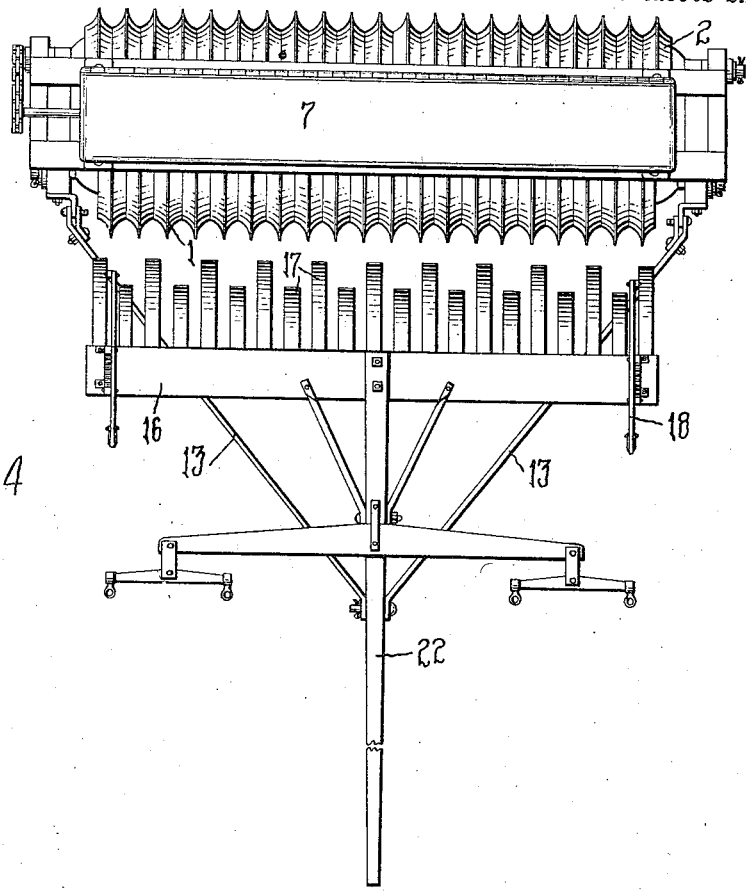
Fig. 4 is a plan view of an implement similar to that shown in Fig. 1, but designed for use as a horse-drawn device.

In the drawings, 1 and 2 indicate disks arranged in two series, the disks 1 being mounted in axial alignment and substantially in contact with each other on a shaft 3, and the disks 2 being similarly arranged on shaft 4. It will be seen from the drawings that these disks are formed with a central circumferential rib or relatively sharp edge and a concave shoulder on each side of this rib. Each series of disks therefore, when assembled constitutes substantially a corrugated cylinder, and operates to crush clods and also to leave the surface compacted and in a series of alternate ridges and furrows. If two series of disks be employed, although for some purposes a single series may be utilized, the disks of the second or rearward series are preferably off-set from those of the forward series, thus operating more effectively to pulverize the soil. The drawings show the rearward series of disks as of somewhat smaller diameter, but this relationship may be varied at will.

The shafts 3 and 4 are mounted in suitable bearings in end frames 5 connected by transverse frame members 6. These frames are shown as extending above the disks and mounted thereupon is a seed hopper 7 in which may be arranged any usual or desired feeding devices 8, operable by chain 9 driven by shaft 3, this shaft being driven by suitable connection to certain of the disks 1. A series of chutes 10 is arranged as usual to convey seed or other material to be deposited in the ground. These chutes are so positioned that the material conveyed will be deposited in the furrows formed by the forward series of disks, the rearward series then operating to cover the deposited material.

In the form shown in Figs. 1 and 2 the end frames 5 are connected, by bolts 11, engaging in any of a series of holes in anglebar 12, to draft bars 13 attached at their forward ends to any desired form of draft rigging, a clevis 14' being shown as a means for coupling the implement to a tractor or other machine. Draft bars 14 are also pivotally connected to the draft rigging as by bolt 15, and these draft bars are rigidly secured at their rearward ends to a plank 16. Spring teeth 17 are bolted to this plank, and adjusting means, comprising levers 18, pivoted adjacent to segments 19, and connected by links 20 to draft bars 13, are provided to predetermine the depth of penetration of teeth 17.

In the form shown in Fig. 3 an alternative surface-preparing device is illustrated, a common form of clod-crusher 21 being substituted in this case for the spring-teeth of Figs. 1 and 2. This form of the implement will be of particular utility when the seeding device is in operation, the use of a surface-leveling and clod-crushing device immediately preceding the treatment with the crushing and furrow forming disks 1 being of especial advantage.

Fig. 4 illustrates the invention embodied in a horse-drawn vehicle, the draft bars 13 being connected to tongue 22. The tongue is shown as extending rearwardly to be securely bolted to plank 16. Adjusting means are provided as in Figs. 1 and 2.

Figure 5:
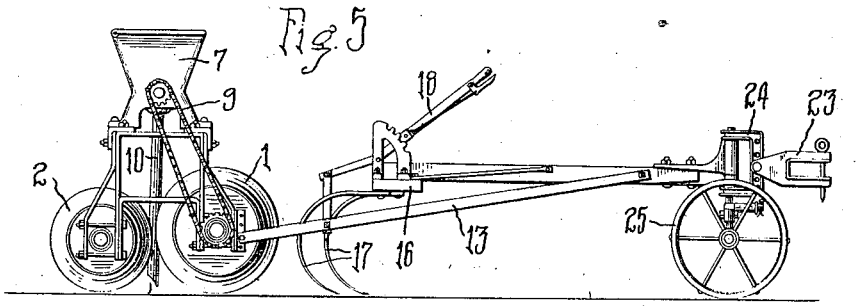
Fig. 5 is an elevation of an implement similar to that in Fig. 1, but provided with wheeled supporting means.

In the implement as shown in Fig. 5, means, as clevis 23, are provided for attachment to a tractor or other machine. This clevis is adjustably connected to frame 24 carrying a wheel 25 whereby the height of the draft rigging and the resultant line of draft may be determined independently of the traction device.

In the form illustrated in Figs. 6 and 7, the disk carrying frame 5 is connected by pairs of links 26, 27, to a forward frame comprising draft bars 28, secured together and to a draft coupling at their forward ends, and supporting adjacent their rearward ends transverse U-bars 29, 30, upon which the spring teeth 31 are mounted. The mounting includes curved blocks 32, thus providing for individual adjustment of the depth of penetration of the teeth relatively to the disks.

In this form of the implement adjusting means are provided comprising a single lever 33 mounted adjacent to a segment 34 and upon a squared shaft 35. This squared shaft 35 has mounted thereupon, near its ends, rock arms 36, connected by links 37 to draft links 26, 27. The adjustment of the lever will, as is obvious, determine the relative penetration of the teeth.

Figs. 8 and 9 show another means providing for the relative positioning of the teeth. In this modification the squared shaft 35' carries at its outer ends rock arms 38 upon which are mounted ground wheels 39. Adjustment of the lever as in Figs. 6 and 7, will in this case determine the position of the ground wheels and thereby the depth of penetration of the teeth. In either of these modifications the lever 33 may have attached thereto an equalizing spring 40 to facilitate manipulation.

It will be understood that the implement may be employed merely to prepare the soil for further operations, a clutch or other means being preferably used, as is common, to disconnect the feed mechanism, or, if seed, fertilizer, or the like, be placed in the seed hopper then such material may be deposited in the earth, the earth-working agencies serving not only to prepare the soil for deposition of seed but to cover the same and to leave the surface in such compacted and ridged condition as will be particularly conducive to the protection and growth of the seed.

Various changes in details may be made in addition to those described without departing from the sprit and scope of the invention, and therefore I do not wish to be limited to the specific details of construction herein shown.

I claim:

1. An agricultural implement comprising a pulverizer, an additional earth working implement arranged in advance of said pulverizer, common draft means for said pulverizer and said additional implement, draw-bar means connecting said pulverizer to said draft means, and means associated with said draw-bar means for determining the depth of penetration of said additional implement.

2. An agricultural implement comprising two series of disks, a shaft carrying each series of disks, two end frames having depending portions in which the ends of both said shafts are supported, means joining said end frames, and a draw-bar connected to each of said frames and adapted to be detachably secured to a preceding implement.

3. An agricultural implement comprising a frame, a series of earth-working disks supported thereon, a second series of disks supported on said frame and arranged in offset relation to the disks of said first series, a second frame, a series of spring harrow-teeth supported on said second frame, draw-bars connecting said first frame to a draft means, and means connecting said second frame to said draw-bars for adjusting the penetration of said teeth relatively to said disks.

4. An agricultural implement comprising a roller earth-working implement, a toothed earth-working implement, said toothed implement arranged in advance of said roller implement, draft means adapted for attachment to a tractor or the like, draw-bars connecting one of said implements to said draft means, means connecting the other of said implements to said draft means and adapted to permit relative vertical movement of the implements, and means associated with said draw-bars and connecting said implements whereby the relative depth of penetration of said implements may be adjusted.

5. An agricultural implement comprising a roller implement having end frames, a second earth-working implement located in advance of the roller implement, draft means adapted for attachment to a tractor, draw-bars connecting each of the end frames of said roller implement to the draft means, draw-bars connecting the frame of said second implement to the draft means, and means supporting the frame of said second implement from said first mentioned draw-bars.

In testimony whereof I affix my signature.

ALVARO S. KROTZ.